United States Patent
Wiedemann

(10) Patent No.: US 12,083,858 B2
(45) Date of Patent: Sep. 10, 2024

(54) LIQUID SYSTEM AND MOTOR VEHICLE COMPRISING SUCH A LIQUID SYSTEM

(71) Applicant: Bayerische Motoren Werke Aktiengesellschaft, Munich (DE)

(72) Inventor: Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 968 days.

(21) Appl. No.: 17/056,299

(22) PCT Filed: May 15, 2019

(86) PCT No.: PCT/EP2019/062443
§ 371 (c)(1),
(2) Date: Nov. 17, 2020

(87) PCT Pub. No.: WO2019/219734
PCT Pub. Date: Nov. 21, 2019

(65) Prior Publication Data
US 2021/0078380 A1    Mar. 18, 2021

(30) Foreign Application Priority Data
May 18, 2018 (DE) ...................... 10 2018 207 851.3

(51) Int. Cl.
*B60H 1/00* (2006.01)
*B60N 2/56* (2006.01)
*F16L 27/08* (2006.01)

(52) U.S. Cl.
CPC .............. *B60H 1/00571* (2013.01); *B60H 2001/00307* (2013.01); *B60N 2/5614* (2013.01); *F16L 27/0845* (2013.01)

(58) Field of Classification Search
CPC .............. B60N 2/5614; B60H 1/00571; B60H 2001/00307; B60H 1/00271;
(Continued)

(56) References Cited

U.S. PATENT DOCUMENTS 2,443,993 A * 6/1948 Schenkelberger .. F16L 27/0845
285/179
2,679,434 A * 5/1954 Herrmann ............. F16L 27/082
137/355.27
(Continued)

FOREIGN PATENT DOCUMENTS

BE          474003 A    7/1947
CN     104442438 A    3/2015
(Continued)

OTHER PUBLICATIONS

English translation of Chinese-language Office Action issued in Chinese Application No. 201980032954.1 dated Mar. 13, 2023 with English translation (seven (7) pages).
(Continued)

*Primary Examiner* — David Bochna
(74) *Attorney, Agent, or Firm* — Crowell & Moring LLP

(57) ABSTRACT

A liquid system for a motor vehicle has at least one supply line which can be supplied with a liquid, and at least one functional unit which can be arranged on a movable component of the motor vehicle and is connected in a communicating manner to the supply line. The supply line has at least one immovable line portion which can be arranged on an immovable component of the motor vehicle and at least one movable line portion which can be arranged on the movable component and is connected to the functional unit. In order to ensure a leakage-proof supply of the functional unit with the liquid, the supply line has at least one rotary coupling via which the immovable line portion is connected in a communicating manner to the movable line portion.

11 Claims, 4 Drawing Sheets

(58) Field of Classification Search
CPC ............ B60H 1/00292; B60H 1/00295; F16L 27/0845; F16L 27/0808; F16L 27/0816; F16L 27/082; F16L 27/0865; F16L 37/30; F16L 37/32; F16L 37/33; F16L 37/36; F16L 37/35

See application file for complete search history.

(56) References Cited

U.S. PATENT DOCUMENTS

| | | | | |
|---|---|---|---|---|
| 2,730,380 | A * | 1/1956 | Espy | F16L 29/04 |
| | | | | 285/379 |
| 3,872,541 | A * | 3/1975 | Peterson | E05D 11/0081 |
| | | | | 16/223 |
| 3,988,859 | A * | 11/1976 | Peterson | E05B 51/02 |
| | | | | 292/201 |
| 4,478,435 | A * | 10/1984 | Cheshier | F16L 27/0808 |
| | | | | 285/918 |
| 4,672,998 | A * | 6/1987 | Kozak, III | F16L 27/093 |
| | | | | 285/190 |
| 4,912,942 | A * | 4/1990 | Katterhenry | F25D 23/028 |
| | | | | 403/80 |
| 5,327,614 | A | 7/1994 | Egner-Walter et al. | |
| 6,626,232 | B1 | 9/2003 | Spinner et al. | |
| 7,679,909 | B2 * | 3/2010 | Spearing | H05K 7/20645 |
| | | | | 165/80.4 |
| 10,627,151 | B2 * | 4/2020 | Downs | B67D 1/0857 |
| 2006/0017361 | A1 * | 1/2006 | Rendel | E05D 11/0081 |
| | | | | 312/405 |

FOREIGN PATENT DOCUMENTS

| | | |
|---|---|---|
| CN | 204263944 U | 4/2015 |
| DE | 39 07 968 A1 | 9/1990 |
| DE | 197 48 781 A1 | 5/1998 |
| DE | 10 2005 057 316 | 6/2007 |
| DE | 10 2012 021 464 A1 | 5/2013 |
| DE | 10 2017 201 756 A1 | 8/2018 |
| EP | 3 228 915 A1 | 10/2017 |
| FR | 641918 A | 8/1928 |
| FR | 1460494 A | 6/1966 |
| GB | 2 073 016 A | 10/1981 |

OTHER PUBLICATIONS

International Search Report (PCT/ISA/210) issued in PCT Application No. PCT/EP2019/062443 dated Sep. 9, 2019 with English translation (five (5) pages).

German-language Written Opinion (PCT/ISA/237) issued in PCT Application No. PCT/EP2019/062443 dated Sep. 9, 2019 (five (5) pages).

German-language Search Report issued in German Application No. 10 2018 207 851.3 dated May 13, 2019 with partial English translation (14 pages).

* cited by examiner

LIQUID SYSTEM AND MOTOR VEHICLE COMPRISING SUCH A LIQUID SYSTEM

BACKGROUND AND SUMMARY OF THE INVENTION

The invention relates to a liquid system for a motor vehicle, having at least one supply line which is capable of being supplied with a liquid and having at least one functional unit which is arrangeable on a movable component of the motor vehicle and which has a communicating connection to the supply line, wherein the supply line has at least one immovable line portion, which is arrangeable on an immovable component of the motor vehicle, and at least one movable line portion, which is arrangeable on the movable component and which is connected to the functional unit.

The invention furthermore relates to a motor vehicle having at least one immovable component of a body of the motor vehicle and having at least one movable component which is connected to the immovable component pivotably about a pivot axis.

A motor vehicle has a body on which components are movably arranged. For example, vehicle doors are arranged on the sides of the body and are connected pivotably to the body by means of hinges. A luggage compartment hood or engine hood at the front or rear is also connected pivotably to the body by means of hinges.

On a correspondingly movable vehicle component, there may be arranged a functional unit which must be supplied with electrical energy or with a fluid in order to be able to perform its function. The functional unit may in this case be for example a vehicle lamp, a switch or some other electrical device. On the other hand, the functional unit may for example be part of a window washer system which must be supplied with a liquid.

Conventional liquid supply arrangements, in the case of which a flexible hose emerges from an immovable body component and is led into a vehicle door, for example correspondingly to a cable of a wiring harness or a hose of a rear window washer system, involve the risk of the flexible hose being kinked. This can result in the hose being damaged, which can lead to leakage of the liquid.

In addition to a classic air conditioning system of a passenger compartment, a motor vehicle may have a system for active temperature control of a passenger compartment component. For example, a seat heater and/or cooler, a steering wheel heater or an armrest heater is provided. These devices are normally implemented by means of correspondingly installed heating mats. It is also known to use Peltier elements for the active cooling of a seat, wherein the Peltier elements cool supplied air, and the cooled air flows through the seat.

It is an object of the invention to ensure a leakage-free supply of liquid to a functional unit which is arrangeable on a movable component of a motor vehicle.

Said object is achieved by means of the independent patent claims. Advantageous configurations are specified in the dependent patent claims, in the following description and in the figures, wherein said configurations may in each case individually, or in a combination of at least two of said configurations, constitute an advantageously refining aspect of the invention.

A liquid system according to the invention for a motor vehicle has at least one supply line which is capable of being supplied with a liquid and has at least one functional unit which is arrangeable on a movable component of the motor vehicle and which has a communicating connection to the supply line, wherein the supply line has at least one immovable line portion, which is arrangeable on an immovable component of the motor vehicle, and at least one movable line portion, which is arrangeable on the movable component and which is connected to the functional unit, and at least one rotary coupling by means of which the immovable line portion has a communicating connection to the movable line portion.

According to the invention, the two line portions of the supply line are connected to one another in articulated fashion by means of the rotary coupling. In this way, in the event of a movement of the movable component relative to the immovable component, the movable line portion can be pivoted relative to the immovable line portion, such that kinking of the respective line portion is prevented. In this way, damage to the supply line and associated leakage of the liquid can be permanently reliably prevented.

The supply line may be led through a body component, for example a sill or side frame, a B pillar and/or a C pillar in order to be able to connect the functional unit via the supply line to a liquid supply. Alternatively, the supply line may be arranged at least partially outside, and fastened to, the body component. The line portions of the supply line may be produced partially or entirely from a flexible or rigid plastic, a plastics composite material, a metal, in particular light metal, or a metal alloy. The movable line portion has a communicating connection to the functional unit.

The functional unit may for example be a part, for example a unit which has at least one spray nozzle, of a window washer system. Alternatively, the functional unit may be configured for heating and/or cooling a portion of the movable component and thus formed as a temperature-control unit. For this purpose, the functional unit is supplied with the liquid, which is subsequently discharged from the functional unit in order to release heat to the functional unit (heating) or dissipate heat therefrom (cooling). Such liquid-type temperature control is considerably quieter and more efficient than conventional air-type temperature control of a vehicle component.

The rotary coupling has two coupling parts which are connected to one another about an axis of rotation and which are sealed off in liquid-tight fashion with respect to one another and through which there extends a continuous liquid channel via which the immovable line portion has a communicating connection to the movable line portion. One coupling part may have a female connecting portion. The other coupling part may have a male connecting portion which is inserted into the female connecting portion in order to form the rotary coupling. The coupling parts may be sealed off with respect to one another by means of at least one sealing element, for example a sealing ring. Even if the liquid were to escape in the region of the rotary coupling, which may occur in the case of a defective rotary coupling, the liquid would escape in the wet region of the motor vehicle and not in the vehicle interior. A seal that is commonly present between the immovable component and the movable component situated in its closed position furthermore prevents liquid that escapes from the rotary coupling in the event of leakage from passing into the vehicle interior or the passenger compartment.

The liquid system may be an open or closed system, wherein, in the latter case, the liquid is circulated in the system, whereas, in the former case, the liquid can be lost or fed for some other use. Preferably, components of the liquid system which come into direct contact with the liquid are chemically resistant to the liquid and to the components contained therein.

In one advantageous configuration, the rotary coupling has an immovable coupling part, which is connected to the immovable line portion, and a movable coupling part, which is connected to the movable line portion, wherein the two coupling parts are connected to one another rotatably about an axis of rotation, and wherein the axis of rotation is identical to a pivot axis of a hinge by means of which the movable component is arranged pivotably on the immovable component. In this way, transverse forces acting on the rotary coupling during the pivoting of the movable component are substantially reduced, which improves the durability of the rotary coupling. The coupling parts are preferably each of rigid form. The respective coupling part may be connected by means of a plug-type connection to an end portion of the line portion respectively connected thereto. Alternatively, the respective coupling part may be produced monolithically with the line portion.

A further advantageous configuration provides that the coupling parts are designed such that, in a state in which they are not connected to one another, they are each closed in liquid-tight fashion and, when transferred into a state in which they are connected to one another, they are opened so as to conduct liquid. In this way, the line portions and the coupling parts can be filled with the liquid before the coupling parts are connected to one another, in order to prevent air from being present in the liquid system after the connecting of the coupling parts, which would inevitably arise in the case of the line portions being retroactively filled with the liquid after the production of the connection between the coupling parts. On the respective coupling part, there may for example be arranged a flap which, during the joining-together of the coupling parts, is displaced as a result of contact with the respective other coupling part. Alternatively, on the respective coupling part, there may be arranged a diaphragm which, during the joining-together of the coupling parts, is pierced as a result of contact with the respective other coupling part.

According to another advantageous configuration, each coupling part is in the form of an angled pipe. In particular, each coupling part may be in the form of a 90°-angled pipe. In this way, the line portions can extend transversely with respect to the axis of rotation of the rotary coupling.

In a further advantageous refinement, the immovable line portion and/or the movable line portion are/is of flexible or rigid form. In this way, the liquid system can be easily structurally adapted to the respective circumstances and requirements.

According to a further advantageous configuration, the liquid system has at least one return line, which has a communicating connection to the functional unit, wherein the return line has at least one immovable line portion, which is arrangeable on the immovable component, at least one movable line portion, which is arrangeable on the movable component, and at least one rotary coupling, by means of which the immovable line portion of the return line has a communicating connection to the movable line portion of the return line. Via the return line, the liquid can be discharged from the functional unit. The return line may be designed correspondingly to the supply line. The abovementioned configurations of the supply line may therefore likewise be implemented correspondingly in the case of the return line.

A further advantageous configuration provides that the supply line, the functional unit and the return line form a liquid circuit which has at least one pump for circulating the liquid in the liquid circuit and at least one set of control electronics for controlling the pump. In this way, the liquid system can be used for example for controlling the temperature of a component on which the functional unit is arranged. The control electronics may be configured to control the pump in a manner dependent on at least one vehicle parameter. For example, the set of control electronics may be configured to control the pump in a manner dependent on a temperature, in particular an interior compartment temperature in a passenger compartment, a component temperature of a component on which the functional unit is arranged, or the like.

According to a further advantageous configuration, the functional unit has at least one heat exchanger which can be supplied with the liquid. In this way, the functional unit is used for the heating and/or cooling of the movable component.

According to a further advantageous configuration, the liquid has an antifreeze agent. For example, the antifreeze agent is added to water in a ratio sufficient for the respective temperature range during use.

A motor vehicle according to the invention has at least one immovable component of a body of the motor vehicle, at least one movable component which is connected to the immovable component pivotably about a pivot axis, and at least one liquid system according to any of the abovementioned configurations or a combination of at least two of said configurations with one another.

The advantages mentioned above with regard to the liquid system are correspondingly associated with the motor vehicle. The liquid system may have a functional unit with at least one spray nozzle by means of which washing water can be applied to a window of the motor vehicle. Alternatively, the liquid system may be used for controlling the temperature of at least one portion of the movable component.

According to one advantageous configuration, the movable component is a vehicle side door or is a front or rear flap. In the case of the vehicle door, the liquid system may be used for controlling the temperature of at least one portion of the vehicle door. In the case of the front or rear flap or hood, the liquid system may be used for applying washing water to a window arranged on the flap.

A further advantageous configuration provides that the functional unit has a thermally conductive connection to a door paneling. In this way, the door paneling can be temperature-controlled by means of the functional unit, for which purpose the functional unit may be in the form of a heat exchanger.

According to a further advantageous refinement, at least one rotary coupling is integrated into a hinge by means of which the movable component is connected pivotably to the immovable component. This is associated with a space-saving arrangement of the rotary coupling. Here, the coupling parts of the rotary coupling of the respective line may be implemented by components of the hinge or separately from these.

Further details, features and advantages of the invention will emerge from the following description and from the figures.

In the figures, identical or functionally identical components are denoted by the same reference designations.

DETAILED DESCRIPTION OF THE DRAWINGS

Figure 1:
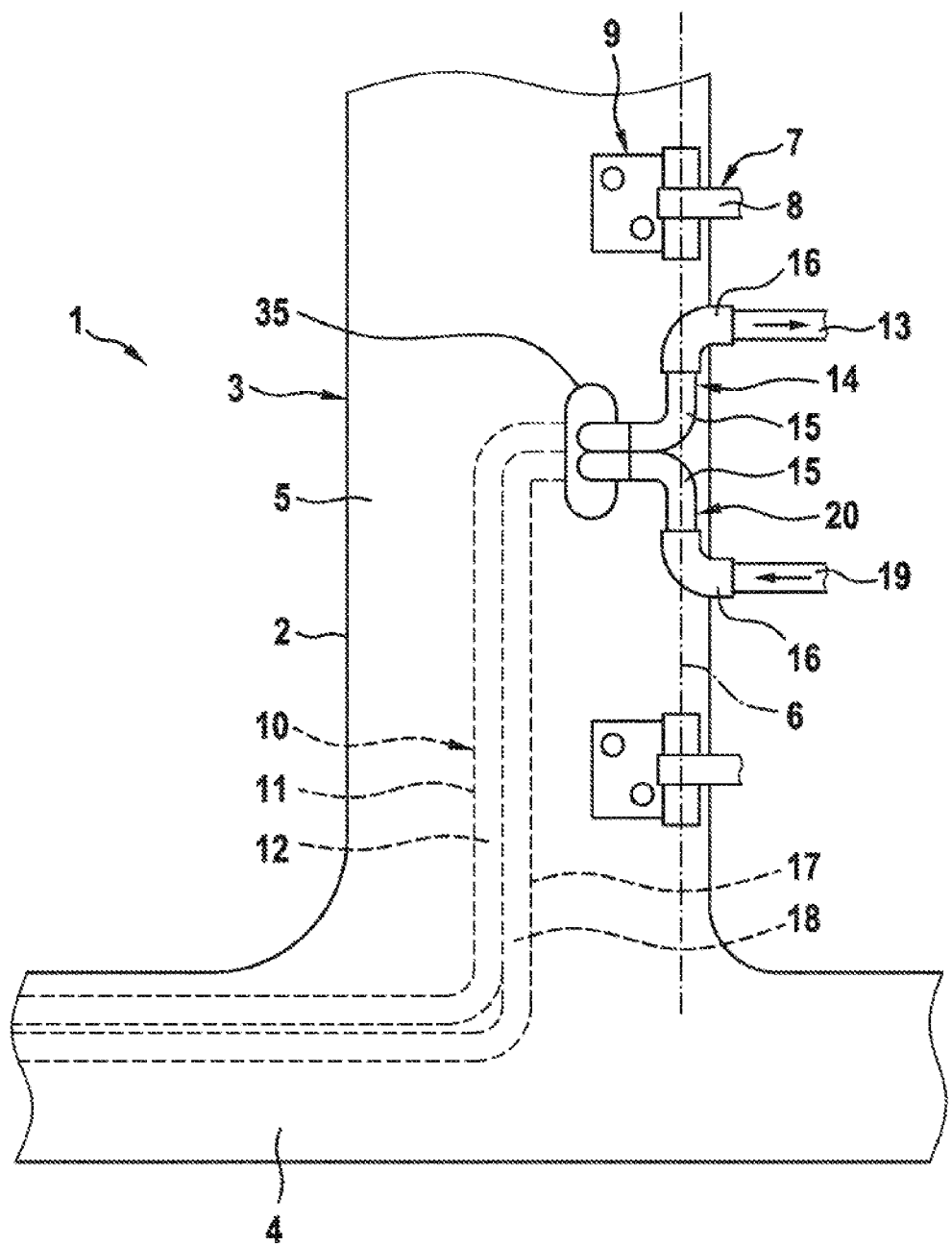
FIG. 1 is a schematic illustration of an exemplary embodiment of a motor vehicle according to the invention.

FIG. 1 is a schematic illustration of an exemplary embodiment of a motor vehicle 1 according to the invention.

The motor vehicle 1 has an immovable component 2 of a body 3 of the motor vehicle 1. The immovable component 2 has a sill 4 and a B pillar 5.

Furthermore, the motor vehicle 1 has a movable component 7 which is connected to the immovable component 2 pivotably about a pivot axis 6 and which is in the form of a vehicle side door and of which FIG. 1 shows only hinge parts 8 of hinges 9 by means of which the movable component 7 is connected pivotably to the immovable component 2.

Furthermore, the motor vehicle 1 comprises a liquid system 10. The liquid system 10 has a supply line 11 which is capable of being supplied with a liquid and has a functional unit (not shown) which is arranged on the movable component 7 of the motor vehicle 1 and which has a communicating connection to the supply line 11. The functional unit may have at least one heat exchanger (not shown) which is capable of being supplied with the liquid and which has a thermally conductive connection to a door paneling (not shown) of the movable component 7. The liquid may have an antifreeze agent.

The supply line 11 has an immovable line portion 12, which is arranged on the immovable component 2, and a movable line portion 13, which is arranged on the movable component 7 and which is connected to the functional unit. Furthermore, the supply line 11 has a rotary coupling 14 by means of which the immovable line portion 12 has a communicating connection to the movable line portion 13. At least one line portion 12 and/or 13 may be of flexible or rigid form.

Figure 4:
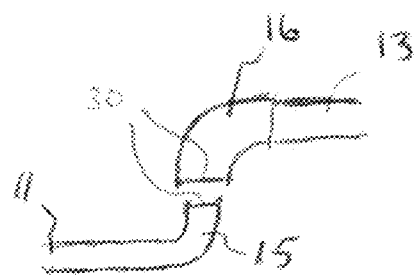
FIG. 4 is a highly schematic illustration of a further aspect of the invention.

The rotary coupling 14 has an immovable coupling part 15, which is connected to the immovable line portion 12, and a movable coupling part 16, which is connected to the movable line portion 13. The two coupling parts 15 and 16 are connected to one another rotatably about an axis of rotation which is identical to the pivot axis 6 of the hinge 9. The coupling parts 15 and 16 may be designed such that, in a state in which they are not connected to one another, they are each closed in liquid-tight fashion and, when transferred into a state in which they are connected to one another, they are opened so as to conduct liquid. For example, there may be arranged a flap or diaphragm 30 on the respective coupling parts, as illustrated generally in FIG. 4. Each coupling part 15 and 16 is in the form of a 90°-angled pipe.

The liquid system 10 furthermore has a return line 17 which has a communicating connection to the functional unit. The return line 17 has an immovable line portion 18, which is arranged on the immovable component 2, a movable line portion 19, which is arranged on the movable component 7, and a rotary coupling 20, by means of which the immovable line portion 18 of the return line 17 has a communicating connection to the movable line portion 19 of the return line 17. The return line 17 is constructed correspondingly to the supply line 11, for which reason, in order to avoid repetitions, reference is made to the above description relating to the supply line 11.

The supply line 11, the functional unit and the return line 17 may form a liquid circuit which has at least one pump (not shown) for circulating the liquid in the liquid circuit and at least one set of control electronics (not shown) for controlling the pump.

The supply line 11 and the return line 17 are led through a common opening 35 on the B pillar 5 and run so as to be in contact with one another. Alternatively, the supply line 11 and the return line 17 may be arranged separately from one another.

Figure 2:
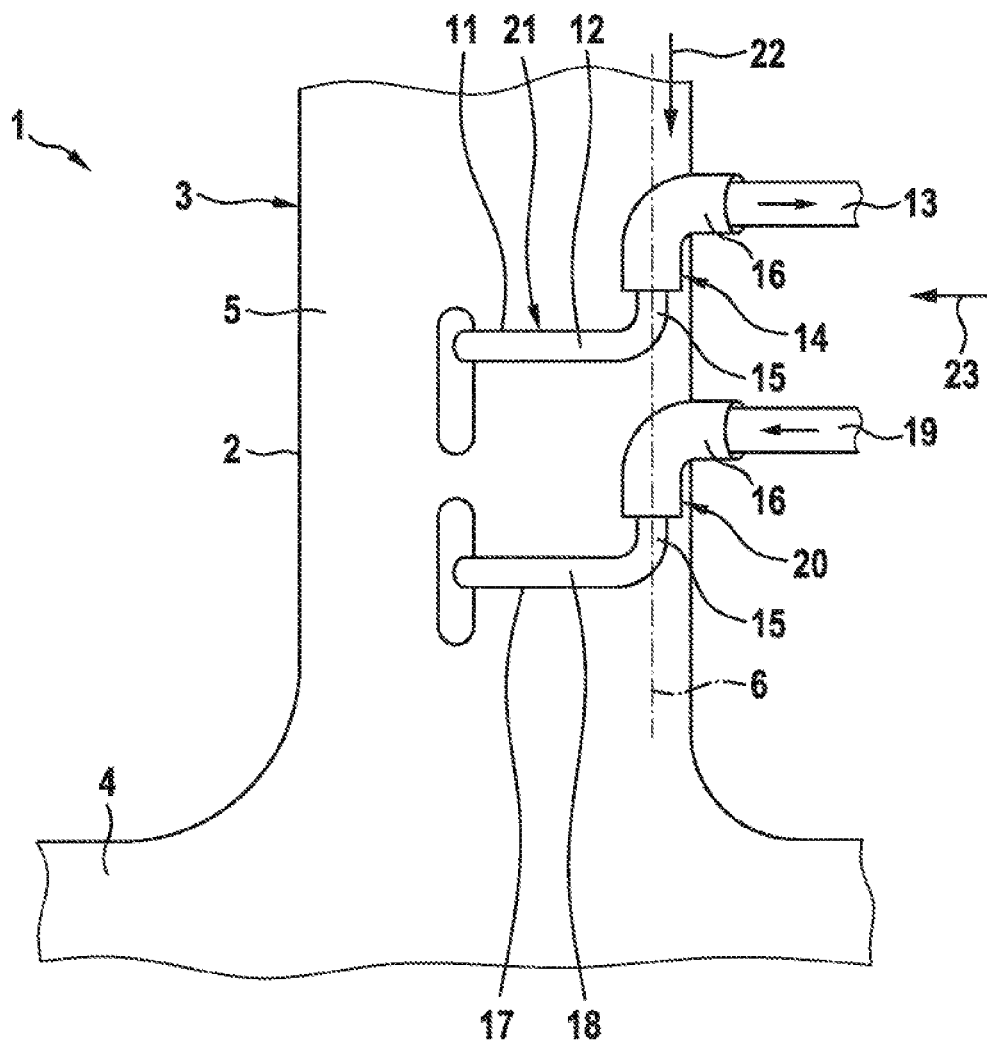
FIG. 2 is a schematic illustration of a further exemplary embodiment of a motor vehicle according to the invention.

FIG. 2 shows a schematic illustration of a further exemplary embodiment of a motor vehicle 1. The liquid system 21 of the motor vehicle 1 differs from the exemplary embodiment shown in FIG. 1 in that the immovable line portions 11 and 17 are arranged separately from one another, in that the rotary couplings 14 and 20 are arranged in an identical manner, and in that the coupling part 15 of the respective rotary coupling 14 or 20 is produced monolithically with the respective immovable line portion 12 or 18. Owing to the identical arrangement of the rotary couplings 14 and 20, two possible joining directions are realized, which are indicated by the arrows 22 and 23. In order to avoid repetition, reference is otherwise made to the above description relating to FIG. 1.

Figure 3:
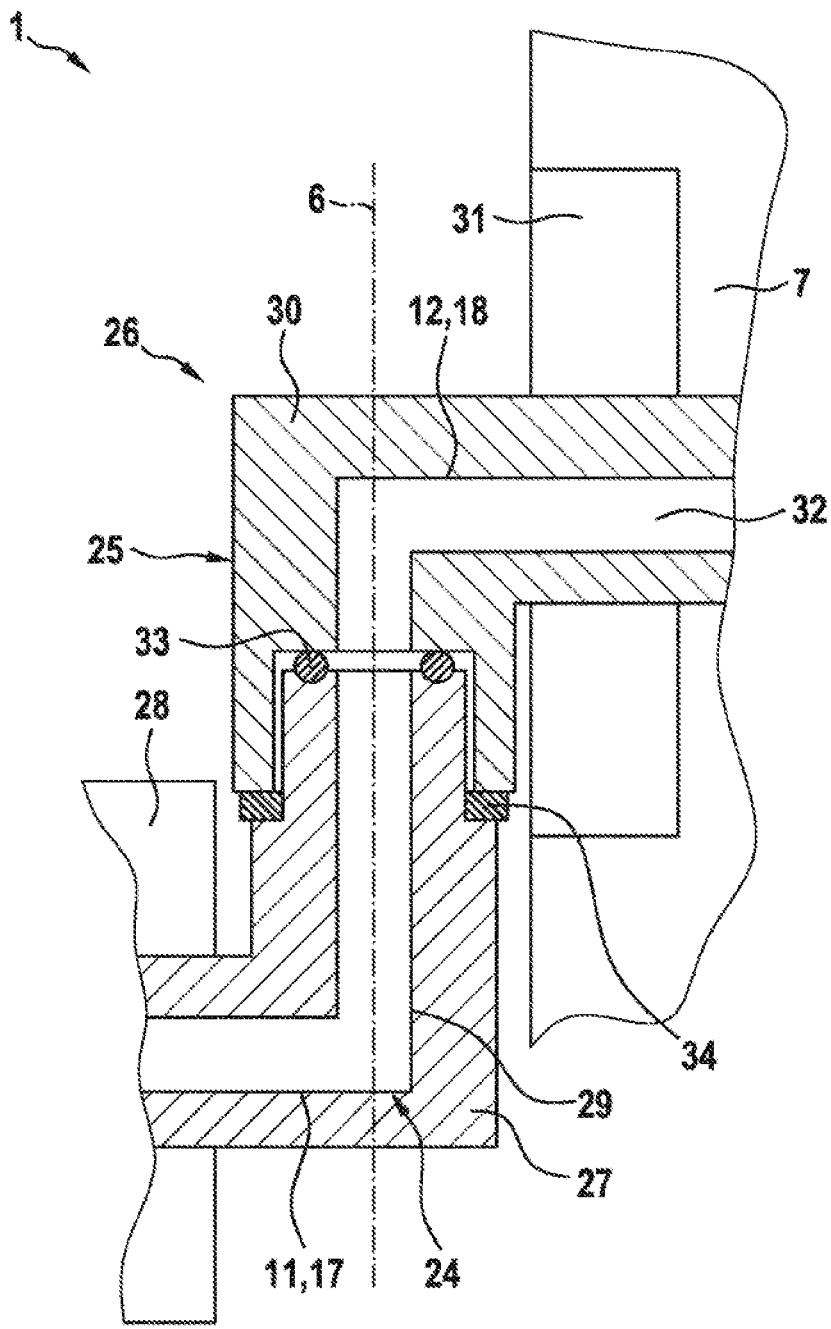
FIG. 3 is a schematic illustration of a further exemplary embodiment of a motor vehicle according to the invention.

FIG. 3 is a schematic illustration of a further exemplary embodiment of a motor vehicle 1 according to the invention. The liquid system 24 of the motor vehicle 1 differs from the exemplary embodiment shown in FIG. 1 and FIG. 2 in that the rotary coupling 25 is integrated into a hinge 26 by means of which the movable component 7 is pivotably connected to the immovable component (not shown).

The hinge 26 has a male hinge element 27 which forms one coupling part of the rotary coupling 25 and which is in the form of a 90°-angled pipe and which is connected to the immovable line portion (not shown) of the supply line 11 or of the return line 17. The hinge element 27 may be fastened by means of a base plate 28 connected thereto to the immovable component. An angled liquid channel 29 runs through the hinge element 27.

The hinge 26 furthermore has a female hinge element 30 which forms the other coupling part of the rotary coupling 25 and which is in the form of a 90°-angled pipe and which is connected to the movable line portion (not shown) of the supply line 11 or of the return line 17. The hinge element 30 is fastened by means of a base plate 31 connected thereto to the movable component 7. An angled liquid channel 32 runs through the hinge element 30, which liquid channel has a communicating connection to the liquid channel 29 of the hinge element 27. The hinge elements 27 and 30 are sealed off with respect to one another by means of two seal rings 33 and 34.

LIST OF REFERENCE DESIGNATIONS

1 Motor vehicle
2 Immovable component
3 Body
4 Sill
5 B pillar
6 Pivot axis
7 Movable component
8 Hinge part
9 Hinge
10 Liquid system
11 Supply line
12 Immovable line portion of 11
13 Movable line portion of 11
14 Rotary coupling of 11
15 Coupling part 16 Coupling part
17 Return line
18 Immovable line portion of 17
19 Movable line portion of 17
20 Rotary coupling of 17
21 Liquid system
22 Arrow (joining direction)
23 Arrow (joining direction)
24 Liquid system
25 Rotary coupling
26 Hinge
27 Hinge element
28 Base plate
29 Liquid channel of 27
30 Hinge element
31 Base plate
32 Liquid channel of 30
33 Seal ring
34 Seal ring
35 Opening on 5

What is claimed is:

1. A liquid system for a motor vehicle, comprising:
at least one supply line which is capable of being supplied with a liquid;
at least one functional unit which is arrangeable on a movable component of the motor vehicle and which has a communicating connection to the supply line, wherein
the supply line has at least one immovable line portion, which is arrangeable on an immovable component of the motor vehicle, and at least one movable line portion, which is arrangeable on the movable component and which is connected to the functional unit,
the supply line has at least one rotary coupling by which the immovable line portion has a communicating connection to the movable line portion,
the rotary coupling has an immovable coupling part, which is connected to the immovable line portion, and a movable coupling part, which is connected to the movable line portion,
the two coupling parts are connected to one another rotatably about an axis of rotation to form the rotary coupling,
the axis of rotation is identical to a pivot axis of a hinge by which the movable component is arranged pivotably on the immovable component, and
the two coupling parts are designed such that, in an unconnected state, each is closed in liquid-tight fashion and, when transferred into a state in which they are connected to one another, the two coupling parts are opened so as to conduct liquid, whereby the immovable and movable line portions and their respectively connected coupling parts are fillable with the liquid before the two coupling parts are connected to one another to form the rotary coupling.

2. The liquid system according to claim 1, wherein each coupling part is in the form of an angled pipe.

3. The liquid system according to claim 1, wherein the immovable line portion and/or the movable line portion are of flexible or rigid form.

4. The liquid system according to claim 1, further comprising:
at least one return line which has a communicating connection to the functional unit, wherein
the return line has at least one immovable line portion, which is arrangeable on the immovable component, at least one movable line portion, which is arrangeable on the movable component, and at least one rotary coupling, by which the immovable line portion of the return line has a communicating connection to the movable line portion of the return line.

5. The liquid system according to claim 4, wherein the supply line, the functional unit and the return line form a liquid circuit which has at least one pump for circulating the liquid in the liquid circuit and at least one set of control electronics for controlling the pump.

6. The liquid system according to claim 1, wherein the functional unit has at least one heat exchanger which is capable of being supplied with the liquid.

7. The liquid system according to claim 1, wherein the liquid has an antifreeze agent.

8. A motor vehicle, comprising:
at least one immovable component of a body of the motor vehicle,
at least one movable component which is connected to the immovable component pivotably about a pivot axis; and
at least one liquid system according to claim 1.

9. The motor vehicle according to claim 8, wherein the movable component is a vehicle side door or is a front or rear flap.

10. The motor vehicle according to claim 9, wherein the functional unit has a thermally conductive connection to a door paneling.

11. The motor vehicle according to claim 8, wherein the at least one rotary coupling is integrated into a hinge by which the movable component is connected pivotably to the immovable component.

* * * * *